(No Model.)

C. S. WHEELWRIGHT.
AGITATING APPARATUS.

No. 555,061. Patented Feb. 18, 1896.

Witnesses:

Charles S. Wheelwright, Inventor

By Foster & Freeman, Attys.

UNITED STATES PATENT OFFICE.

CHARLES S. WHEELWRIGHT, OF WICKFORD, RHODE ISLAND.

AGITATING APPARATUS.

SPECIFICATION forming part of Letters Patent No. 555,061, dated February 18, 1896.

Application filed April 19, 1894. Serial No. 508,211. (No model.)

*To all whom it may concern:*

Be it known that I, CHARLES S. WHEELWRIGHT, of Wickford, in the State of Rhode Island, have invented an Improved Agitating Apparatus for Securing a Uniform Admixture of Particles of Solid Matter with Liquids, of which the following is a specification.

My invention is especially applicable to the preparation of fillings for the manufacture of paper and of cotton goods, or for mixing sulphate of lime, starch, clay, &c., with water, but may be used for securing the admixture of any finely-divisible material with liquid.

The apparatus consists of a conical tank or a tank with a conical bottom and a centrifugal or other pump connected with the bottom of said tank by a suction-pipe and with the top of said tank by a return-pipe entering said tank at one side tangential with the periphery thereof.

Figure 1:
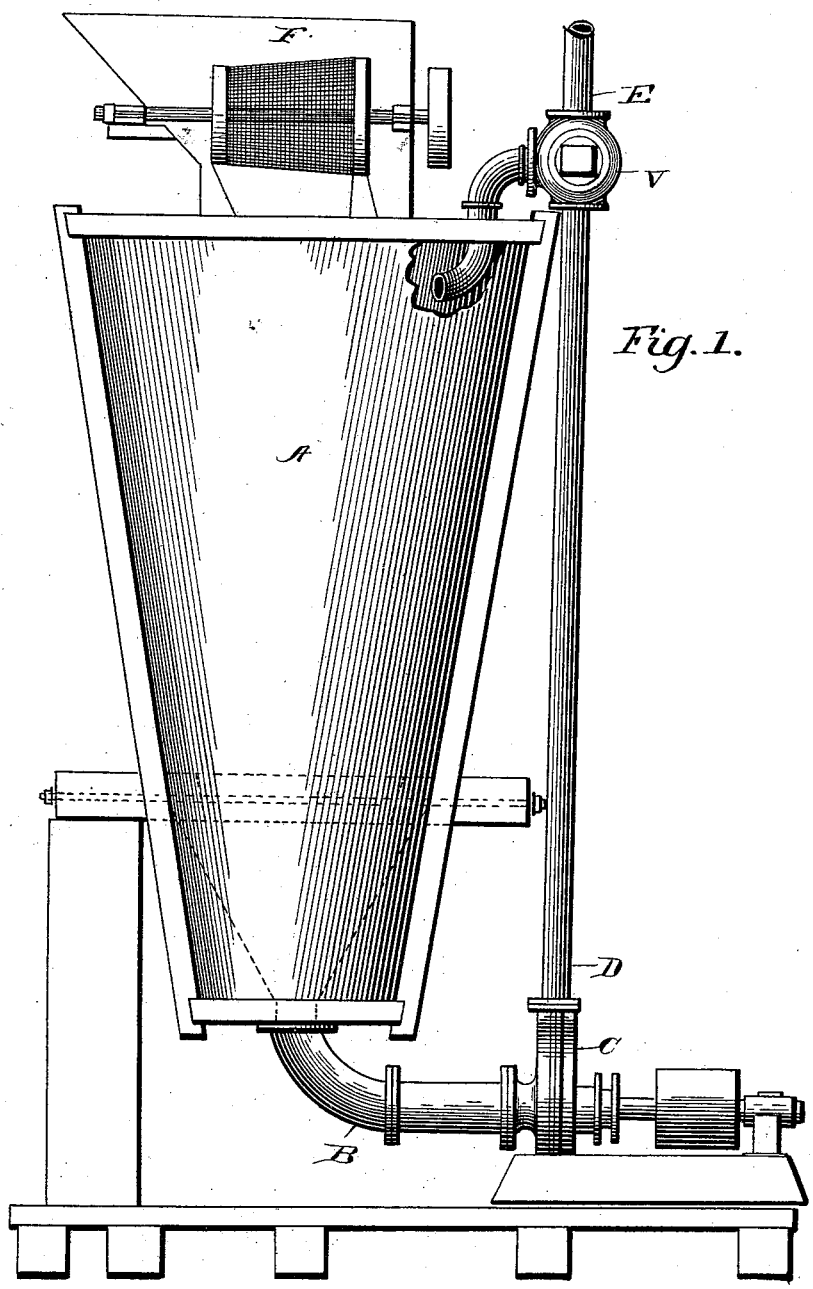
Figure 2:
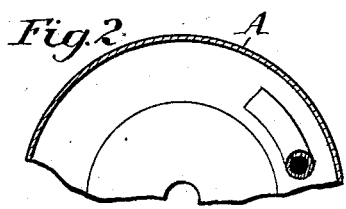

In the accompanying drawings, Figure 1 is a side elevation with a portion of the wall of the tank broken away, and Fig. 2 is a sectional plan of a portion of the tank.

A is a conical tank or a tank with a conical bottom.

B is a pipe leading from the bottom of the tank substantially at the center to the pump.

C is a centrifugal or other pump having a continuous discharge.

D is a return-pipe leading from the pump to the top of the tank, which it enters at one side in such direction that the liquid leaving it will revolve in the same direction as the liquid or liquid mixture already in the tank, circling and falling under the force of the suction-pump. The return-pipe D has a three-way valve V to shut off the flow to the tank and open a discharge-pipe E.

F is a revolving sieve at the top of the tank, through which the material to be mixed with the liquid is fed to the tank.

In the operation when the pump is put to work the liquid in the tank soon assumes a rapid spiral motion, in which it is aided rather than retarded by the inflow of the returning liquid, and the conical form of the tank prevents the lagging of any portion and the consequent settling of solid parts or particles of the admixture.

I claim—

The combination with a conical tank or a tank with a conical bottom, of a centrifugal or similar continuously-discharging pump connected with the bottom of said tank by a suction-pipe, and with the top of said tank by a return-pipe entering at one side tangential with the periphery thereof, substantially as described.

CHAS. S. WHEELWRIGHT.

Witnesses:
    FRANCIS H. SWAN,
    WILLIAM W. SWAN.